UNITED STATES PATENT OFFICE.

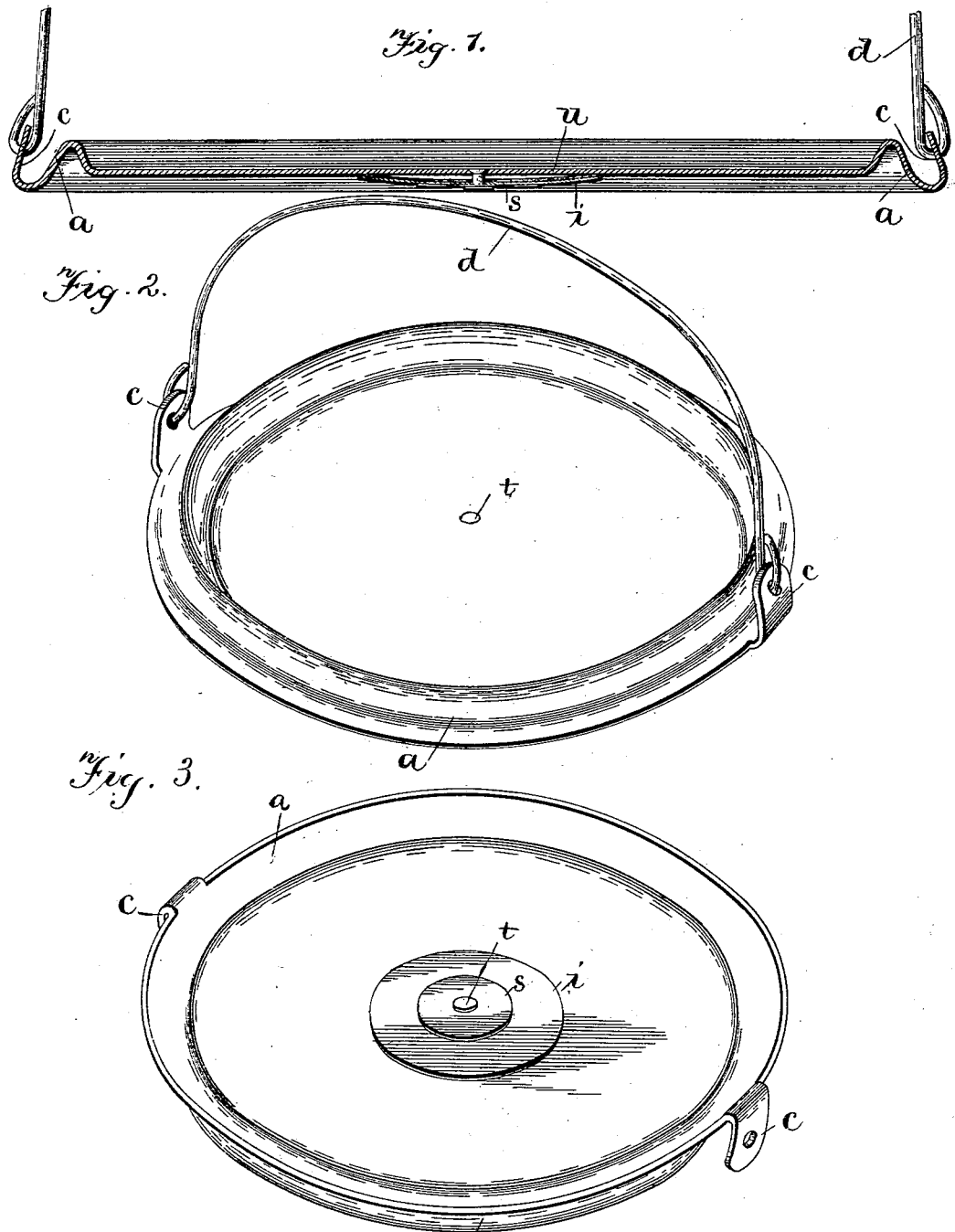

THOMAS A. WATROUS, OF ELMIRA, NEW YORK, ASSIGNOR TO THE CRONK HANGER COMPANY, OF SAME PLACE.

GRIDDLE.

SPECIFICATION forming part of Letters Patent No. 560,116, dated May 12, 1896.

Application filed December 21, 1894. Serial No. 532,590. (No model.)

*To all whom it may concern:*

Be it known that I, THOMAS A. WATROUS, of Elmira, in the county of Chemung and State of New York, have invented certain new and useful Improvements in Griddles; and I do hereby declare the following to be a full, clear, and exact description of the invention, such as will enable others skilled in the art to which it pertains to make and use it, reference being had to the accompanying drawings, which form part of this specification.

My invention has relation to griddles; and it relates to a griddle of an improved construction, whereby the concentration of heat at the center of the griddle is prevented and an equal distribution of heat throughout the entire surface of the griddle accomplished, whereby the difficulties now existing in the ordinary griddle of having the grease burn at the center and also the cakes cooked quicker at the center than at the sides are prevented, and a griddle provided which will cook evenly throughout its entire surface.

The object of my invention is to provide a griddle having a downwardly-turned flange which extends below the under side of the griddle to support its entire surface above the surface of the stove, thus forming a hot-air chamber, so that the heat is supplied from this common source, thus providing the first principle of an equal distribution of heat throughout the entire surface thereof, and to provide at the center of the under side of the griddle two or more plates, preferably of unequal sizes, for the purpose of receiving a packing of non-conducting material, such as asbestos or other similar material, the said plates being preferably of galvanized iron.

In the accompanying drawings, Figure 1 is a transverse vertical section of a griddle embodying my invention. Fig. 2 is a perspective view of the top of the griddle. Fig. 3 is a perspective view of the under side of the griddle.

The griddle is composed, preferably, of sheet metal, being dished at its upper side by turning the metal upward and downward at an inclination, as shown at $a$, and turning the same downward a suitable distance below the surface of the central portion of the griddle, as shown at $b$. The opposite sides of the griddle are formed, preferably, with integral ears $c$, which are perforated to receive a lifting-handle $d$. From this description it will be seen that I provide a cheap but very effective and durable griddle of sheet-steel or other suitable sheet metal and provide a hot-air chamber $e$ between the entire under surface of the baking portion of the griddle and the stove. This provides for the first principle of the equal distribution of heat throughout the surface of the griddle; but with this alone there is a concentration of heat at the center of the griddle, as is well understood. The concentration of heat at the center of the griddle is disagreeable for several reasons, the prominent ones being that there is an unequal baking of the cakes or other material on the griddle, and, secondly, that the center becoming much hotter than the surrounding surface of the griddle there is a burning of the grease, making a very disagreeable smoke. I prevent the concentration of heat at the center by a novel arrangement. This arrangement consists of several plates of unequal diameter, the first $i$ being preferably about one-third the diameter of the griddle, and a second plate $s$ about one-half the diameter of the plate $i$. Both of these plates are secured to the center of the griddle by a single rivet $t$, as clearly shown in Fig. 1. By making these plates of unequal sizes the heat is distributed and equalized from the center of the plates, and placed between the inner plate $i$ and the griddle proper is a packing of non-conducting material $u$, which, as will be readily understood, intercepts the heat provided for the central portion of the griddle and serves as a medium for preventing the concentration of heat at this point, thus causing an equal distribution of heat throughout the entire surface of the griddle.

Where a griddle is made thicker at the center than at its edges, the concentration of heat at the center is merely delayed, and when this thickened central portion becomes heated the difference between the heat in the central portion and that of the surrounding portion is greater than it is in an ordinarily-constructed griddle. Where, however, central plates are made of separate metal, heat is not so completely carried by one plate to the other as it is where the metal is solid and very materially intercepts the heat and causes to a very great extent an equal distribution of the heat. When, however, I provide the non-conducting material hereinbefore mentioned between the inner plate and the griddle, this interception of the heat is more thoroughly provided for and more thoroughly accomplished, thus preventing the center absolutely from becoming hotter than the surrounding surface of the griddle, as has been thoroughly and clearly demonstrated in practice. I do not, therefore, wish to limit myself to the use of the non-conducting material, for the reason that by the use of the central plates of varying dimensions, as hereinbefore stated, the concentration of the heat is very materially prevented at the center of the griddle, but more effectually so with the non-conducting material; nor is it found necessary on griddles of the smaller pattern and constructed from thinner sheets to have more than one extra plate added to the bottom, said plate serving to cover the non-conducting mat and secure it in place and together with it prevent the free passage of heat from below to the upper surface of the griddle.

In order that my attachment at the under side of the griddle may be most effectual, it is absolutely necessary that the space between the large plate and the under side of the griddle be absolutely a dead-air space. With this end in view the asbestos serves not only as a non-conductor between the plate and the griddle, but owing to the dished form of the plate and the rivet passing through the same causing a strain or tension upon the plate the asbestos forms a packing between the edge of the plate and the griddle, thus making an absolutely air-tight joint and forming a dead-air chamber between the asbestos and the griddle, thus excluding the hot air absolutely from the same and answering in the most effectual manner the purpose designed to be accomplished in this application, thus serving a double function—one of forming a packing to make an absolute dead-air space and the other acting as a non-conductor, thus causing a diffusion of the heat and preventing a concentration thereof at the center of the griddle. In this connection it should be observed that the dished plate or plates is or are arranged above the plane of the bottom edge of the downturned supporting-flange of the griddle, so that the said plate or plates will be above the surface of the stove and out of contact with the same.

Having thus fully described my invention, what I claim, and desire to secure by Letters Patent, is—

1. A griddle of the character described having the dished plate on the under side of the center above the plane of the supporting-flange of the griddle so as to be out of contact with the surface of the stove, and the central securing means drawing the plate up against the bottom of the griddle so that the plate is under tension and so as to form the dead-air space between the plate and the bottom of the griddle as and for the purpose set forth.

2. The griddle of the character described having the series of separate dished plates arranged at the center of its under portion, said plates varying in size, the central rivet securing the plates to the griddle and holding the plates under tension, and the packing between the edge of the uppermost plate and the griddle, so that a dead-air space is formed between the uppermost plate and the griddle, as and for the purposes set forth.

In testimony whereof I affix my signature in presence of two witnesses.

THOMAS A. WATROUS.

Witnesses:
E. W. PACKARD,
CHAS. R. PRATT.